United States Patent [19]

Barter

[11] 4,134,385
[45] Jan. 16, 1979

[54] STOVE FRAME ADAPTER

[76] Inventor: Owen H. Barter, 14 Raymond St., Manchester, Mass. 01944

[21] Appl. No.: 653,112

[22] Filed: Jan. 28, 1976

[51] Int. Cl.² .............................................. F24C 5/20
[52] U.S. Cl. ..................................... 126/38; 126/43; 126/44; 248/150; 248/152
[58] Field of Search .................. 126/43, 38, 50, 44, 126/262; 248/150, 152, 154, 146

[56] References Cited

U.S. PATENT DOCUMENTS

| 901,326 | 10/1908 | Ebert | 248/152 X |
|---|---|---|---|
| 1,307,482 | 6/1919 | Cheek | 248/152 |
| 1,310,830 | 7/1919 | Hothersall | 126/43 |
| 3,025,850 | 3/1962 | Binkley et al. | 126/43 |
| 3,038,402 | 6/1962 | Singer | 126/43 X |
| 3,357,669 | 12/1967 | D'Amato | 248/152 X |

FOREIGN PATENT DOCUMENTS

| 671210 | 2/1939 | Fed. Rep. of Germany | 126/43 |
|---|---|---|---|
| 866033 | 3/1941 | France | 126/44 |
| 69223 | 5/1958 | France | 126/38 |
| 253623 | 10/1926 | Italy | 126/43 |
| 343241 | 9/1936 | Italy | 126/43 |
| 512024 | 8/1939 | United Kingdom | 126/43 |

Primary Examiner—Irwin C. Cohen
Attorney, Agent, or Firm—Thomas C. Stover, Jr.

[57] ABSTRACT

A stove frame adapter for heating articles above a heat container, eg. canned heat, is provided in the form of an annular frame having a plurality of opposed arms which bend upwardly to support an article above the heat container and one or more arms which bend downwardly in close clearance with the container to secure the stove frame adapter to same. The adapter has an opening therein aligned with the opening of the container to admit heat therethrough to the article.

3 Claims, 5 Drawing Figures

STOVE FRAME ADAPTER

FIELD OF THE INVENTION

This invention relates to a stove frame, particularly a stove frame adapter for use in cooking with a container of heat.

THE PRIOR ART

Several stove frames have been devised for use with a heat container, eg. canned heat. Such frames fit over or around the heat can to provide a platform for holding the article above the heat source for heating application thereto, eg. cooking. Examples of said stove frames are disclosed in U.S. Pat. No. 1,227,872 to Crane, U.S. Pat. No. 3,145,706 to Saunders, and U.S. Pat. No. 3,371,659 to Paspalas. Such stove frames are characterized by either being attached to the container to which the heat is applied or being relatively bulky or non-collapsible for easy storage and transport thereof. There is, therefore, a need and market for a stove frame adapter that substantially overcomes the above objections.

There has now been developed a stove frame adapter which lays flat for easy storage and shipment thereof and which bends to hold two heat containers in a stack and which, when bent, supports articles to be heated a desired space above the heat container. The adapter of the invention is further detachable from the heat container and article and can be bent back to its originally flat position.

SUMMARY

Broadly, the present invention provides a stove frame adapter for heating articles comprising, a frame having an opening therein, said frame having a plurality of opposed arms which bend upwardly to support an article to be heated above said frame and at least one arm which bends downwardly in close clearance with a heat supply container to position said frame over same, the frame opening being aligned with the opening of said container to admit heat therethrough to said article.

DESCRIPTION

The invention will become more clear from the following detailed specification and drawing in which.

Figure 1:
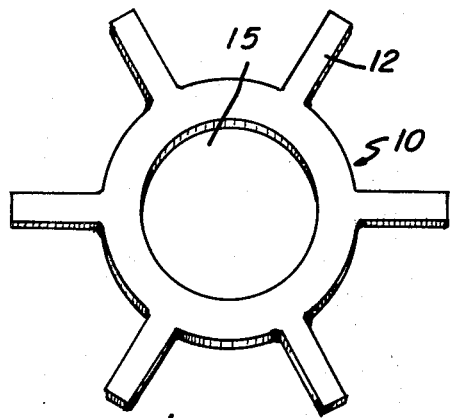
FIG. 1 is a plan view of the stove frame adapter of the present invention.
Figure 2:
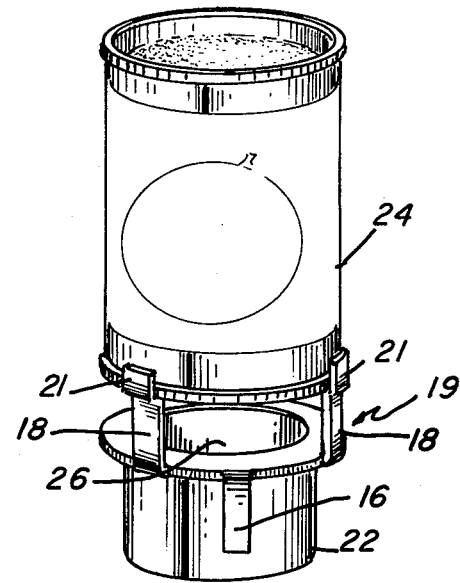
FIG. 2 is an isometric projection of the stove frame adapter of the invention in use.
Figure 3:
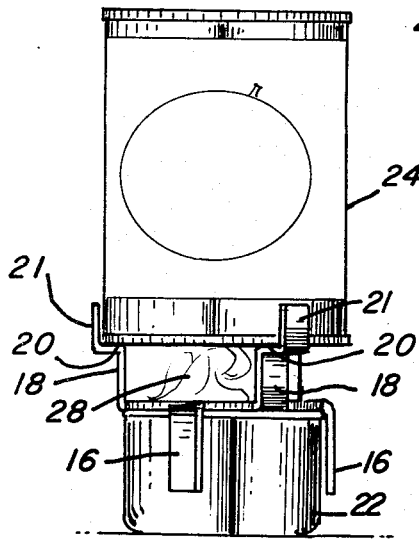
FIG. 3 is an elevation view of the stove frame adapter in such use.
Figure 4:
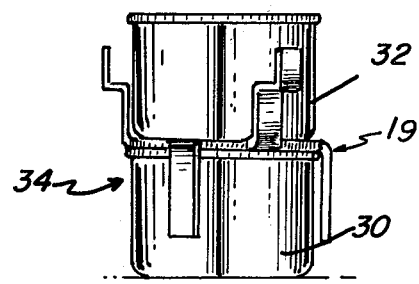
FIG. 4 is an elevation view of the stove frame adapter of the invention in a storage use.

Referring now to the drawings, annular stove frame adapter 10 has six radial opposed arms 12 projecting therefrom, as shown in FIG. 1. The arms 10 alternatively bend up and down to lower arms 16 and upper arms 18 to form stove frame adapter 19, as shown in FIGS. 2, 3 and 4. The lower arms 16 fit in close conformity with a heat container, such as canned heat (Sterno) 22, shown in FIGS. 2 and 3. The upper arms 18 preferably also bend outwardly at 20 and again upwardly at 21 to securely position the article to be heated, eg. can 24, above the canned heat 22, as shown in FIGS. 2 and 3. The can of heat 22 is opened at opening 26 and ignited (by means not shown) to provide a flame 28 through the opening 15 in the stove frame adapter 19, under the can 24 to heat the same and cook the contents thereof, as shown in FIG. 3.

When not in use, the arms 16 and 18 of the stove frame adapter 10 can be bent back to lay-flat, as shown in FIG. 1 or bent back to nearly lay-flat, leaving bends 20 and 21 therein. Alternatively, the arms 16 and 18 can remain bent to grip two cans of heat 30 and 32 above and below in a stack of two cans 34 for storage or carrying purposes, as shown in FIG. 4.

Figure 5:
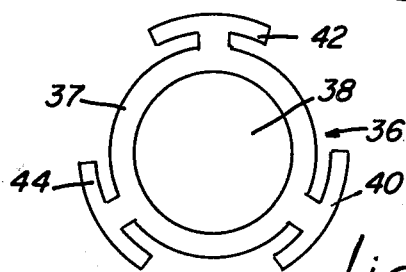
FIG. 5 is a plan view of another stove frame adapter of the present invention.

In another embodiment, stove frame adapter 36 has annular ring 37, having opening 38, with branched arm 40 which bends downwardly and branched arms 42 and 44 which bend upwardly in opposition, as shown in FIG. 5.

From the above disclosure it can be seen that the stove frame adapter embodying the invention can be stored compactly when not in use and further has a bendable lower arm or arms which fit or bend around various-sized containers and bendable upper arms which can support various-sized articles thereabove.

The stove frame adapter of the invention has an opening therein, preferably at its center, and is preferably annular. The opening can be rounded or angular in shape or a combination thereof and can have, where desired, metal strands bridging the opening as a lattice, gridwork and the like. Preferably, an adapter with a round opening is employed, one which corresponds or is a little larger than the opening of the heat container.

The adapter of the invention has at least three arms, one which bends downwardly to contact or closely clear the heat container, and two which are substantially opposed and extend upwardly to support the article to be heated. However, the adapter of the invention desirably has at least two arms which bend downwardly and at least two upwardly, or four arms. Further, the stove frame adapter of the invention can have five arms, two opposed arms bending downwardly and three opposed arms bending upwardly. Preferably, the adapter of the invention has six or more arms, three or more opposed arms bending downwardly and three or more opposed arms bending upwardly to more securely hold the heat container and article, respectively.

By "opposed" arms as used herein is meant, arms pointing upwardly or downwardly which are directly across from each other or nearly so, if there are only two arms; arms which are approximately 120° apart if there are three arms; arms which are 90° apart if there are four such arms, and the like. The degree of separation of the arms can vary as desired, provided feasible arm opposition is maintained.

By "heat container" is meant a container of fuel which can be ignited by a match, spark and the like. This fuel can be liquid, eg. kerosene, or desirably solid, eg. paraffin or other wax carrier, and preferably is commercially available canned heat, eg. one trademarked "Sterno".

By "article" is meant a can, such as a can of beans which can be opened and heated directly upon the stove frame adapter of the invention. The article can be further a cooking pan, eg. a frying pan which sets atop the upwardly extending frame arms.

The arms of the frame can extend straight upwardly and straight downwardly within the scope of the invention and a frypan can set upon the tops of the upward arms. The upward arms desirably bend outwardly and upwardly, as illustrated in FIGS. 2 and 3 and can have a further succession of stepwise bends where desired.

The arms are of sturdy material which give strong support yet are bendable to enable the bending of the arms to fit various-sized heat containers and various-sized articles, eg. cans of heatable contents. Of course, larger objects, eg. pans can set atop the arm tips and extend out thereover within the scope of the invention. For this purpose the arm tips are desirably curled over, beaded and the like. The pans can hold various contents therein, eg. water to be heated for various beverages, soups and the like, as well as to boil vegetables therein or to warm baby bottles or other articles and the like.

The stove frame adapter of the invention can be of various flame-resistant sturdy materials, and preferably of bendable metal such as tin, aluminum, flexible steel and the like. Preferably, the stove frame adapter of the invention is made of malleable stainless steel.

The stove frame adapter can come in various sizes, eg. with openings approximate to or larger than the openings of various-sized heating (Sterno) cans, to fit such various-sized cans. In the case of larger such heating cans, the upper stove frame arms can bend inwardly to support relatively small size articles thereabove, eg. relatively small diameter cans. Moreover, a single stove frame adapter of the invention can fit various-sized heating cans depending on the location of the bends of the downward arms. Where suitable, the downward arms can bend inwardly, eg. to contact and center relatively small heating cans.

What is claimed is:

1. A stove assembly comprising in combination, a stove frame adapter formed from a malleable material and having an annular, planar, horizontal member with an opening therein, a heat supply container with an opening in the top thereof and an article to be heated, said adapter having a plurality of opposed arms extending from the outer edge of said annular horizontal surface, which arms have bends upwardly to support said article above said frame, each of said opposed arms including a generally vertical portion extending from said firstmentioned bend to further bends forming a generally horizontal surface and a following generally vertical portion, said frame adapter also having at least one arm which has a bend downwardly in close clearance with a side of said heat supply container to support said annular horizontal member on said heat supply container so that the frame adapter opening is aligned with the opening of said container to admit heat therethrough to said article, said frame adapter being supported solely by said heat container, the arms of said stove frame adapter are bendable to fit different sized articles and containers and also bendable to render said adapter flat for ready storage, said frame adapter being reuseable with other heat supply containers and other articles.

2. The stove assembly of claim 1 wherein said adapter has a plurality of arms which bend downwardly.

3. The stove assembly of claim 1 wherein said adapter has at least three opposed arms which have bends upwardly and at least three opposed arms which have bends downwardly.

* * * * *